US009694893B2

(12) United States Patent
Jenkins (10) Patent No.: US 9,694,893 B2
(45) Date of Patent: Jul. 4, 2017

(54) ENHANCED STEERING (71) Applicant: Gibbs Technologies Limited, Warwickshire (GB)

(72) Inventor: Neil Graham Jenkins, Warwickshire (GB)

(73) Assignee: Gibbs Technologies Limited, Warwickshire (GB)

( * ) Notice: Subject to any disclaimer, the term of this patent is extended or adjusted under 35 U.S.C. 154(b) by 0 days.

(21) Appl. No.: 14/435,637

(22) PCT Filed: Oct. 14, 2013

(86) PCT No.: PCT/GB2013/052680
§ 371 (c)(1),
(2) Date: Apr. 14, 2015

(87) PCT Pub. No.: WO2014/057292
PCT Pub. Date: Apr. 17, 2014

(65) Prior Publication Data
US 2015/0266556 A1 Sep. 24, 2015

(30) Foreign Application Priority Data

Oct. 14, 2012 (GB) .................................. 1218402.4

(51) Int. Cl.
*B63H 21/21* (2006.01)
*B63H 11/107* (2006.01)
(Continued)

(52) U.S. Cl.
CPC ............. *B63H 21/213* (2013.01); *B60F 3/00* (2013.01); *B63H 11/08* (2013.01); *B63H 11/107* (2013.01);
(Continued)

(58) Field of Classification Search
CPC ...... B63H 21/00; B63H 21/21; B63H 21/213; B63H 21/22; B63H 11/00; B63H 11/08;
(Continued)

(56) References Cited

U.S. PATENT DOCUMENTS

| 2,343,313 A | 3/1944 | Maynes |
| 5,643,019 A | 7/1997 | Barnett et al. |

(Continued)

FOREIGN PATENT DOCUMENTS

| CN | 1882473 | 12/2006 |
| CN | 101014994 | 8/2007 |
| JP | 1-175596 | 7/1989 |

OTHER PUBLICATIONS

European Patent Office; International Search Report; May 16, 2014.
(Continued)

*Primary Examiner* — Lars A Olson
(74) *Attorney, Agent, or Firm* — Price Heneveld LLP (57) ABSTRACT

A watercraft or amphibian includes a prime mover operable with at least a first and a second idle speed, a marine propulsion device operable to generate thrust when connected to the prime mover, and a determining arrangement for determining whether or not the watercraft or amphibian is operating at or above a determined speed of travel, wherein the second idle speed of the prime mover is higher than the first idle speed, the marine propulsion device generates a steerable thrust when operated by the prime mover at a speed at or above the second idle speed, and wherein the prime mover is operated with the second idle speed when the determining arrangement determines the watercraft or amphibian is operating at or above the determined speed of travel.

37 Claims, 3 Drawing Sheets (51) Int. Cl.
*B63H 11/08* (2006.01)
*F02D 29/02* (2006.01)
*B60F 3/00* (2006.01)

(52) U.S. Cl.
CPC ............ *B63H 21/21* (2013.01); *B60F 3/0007* (2013.01); *B63H 2021/216* (2013.01); *F02D 29/02* (2013.01)

(58) Field of Classification Search
CPC ..... B63H 11/11; B63H 11/113; B63H 11/107; B63H 25/46
USPC .......................................... 440/1, 38, 41, 42
See application file for complete search history.

(56) References Cited

U.S. PATENT DOCUMENTS

| | | |
|---|---|---|
| 5,809,436 A | 9/1998 | Gregory |
| 6,004,173 A | 12/1999 | Schott |
| 6,124,809 A | 9/2000 | Boudriau |
| 6,159,059 A | 12/2000 | Bernier et al. |
| 6,231,410 B1 | 5/2001 | Bernier et al. |
| 6,336,833 B1 | 1/2002 | Rheault et al. |
| 6,390,862 B1 | 5/2002 | Eichinger |
| 6,428,371 B1 | 8/2002 | Michel et al. |
| 6,474,298 B2 | 11/2002 | Kanno |
| 6,478,638 B2 | 11/2002 | Matsuda et al. |
| 6,508,680 B2 | 1/2003 | Kanno |
| 6,520,815 B2 | 2/2003 | Bernier et al. |
| 6,523,489 B2 | 2/2003 | Simard et al. |
| 6,530,812 B2 | 3/2003 | Koyano et al. |
| 6,551,152 B2 | 4/2003 | Matsuda et al. |
| 6,551,153 B1 | 4/2003 | Hattori |
| 6,554,661 B2 | 4/2003 | Bernier et al. |
| 6,568,968 B2 | 5/2003 | Matsuda |
| 6,568,969 B2 | 5/2003 | Bernier et al. |
| 6,589,085 B2 | 7/2003 | Matsuda et al. |
| 6,634,912 B2 | 10/2003 | Bernier et al. |
| 6,663,446 B2 | 12/2003 | Bernier et al. |
| 6,663,447 B1 | 12/2003 | Bernier et al. |
| 6,668,796 B2 | 12/2003 | Umemoto et al. |
| 6,675,730 B2 | 1/2004 | Simard et al. |
| 6,695,657 B2 | 2/2004 | Hattori |
| 6,699,085 B2 | 3/2004 | Hattori |
| 6,701,897 B2 | 3/2004 | Chatfield |
| 6,709,302 B2 | 3/2004 | Yanagihara |
| 6,709,303 B2 | 3/2004 | Umemoto et al. |
| 6,722,302 B2 | 4/2004 | Matsuda et al. |
| 6,733,350 B2 | 5/2004 | Iida et al. |
| 6,733,351 B2 | 5/2004 | Mashiko |
| 6,783,408 B2 | 8/2004 | Uraki et al. |
| 6,793,545 B2 | 9/2004 | Bernier et al. |
| 6,817,338 B2 | 11/2004 | Janic et al. |
| 6,827,031 B2 | 12/2004 | Aoyama |
| 6,855,014 B2 | 2/2005 | Kinoshita et al. |
| 6,863,580 B2 | 3/2005 | Okuyama |
| 6,868,317 B2 | 3/2005 | Okuyama |
| 6,890,223 B2 | 5/2005 | Kanno |
| 6,905,378 B2 | 6/2005 | Uraki et al. |
| 6,905,381 B2 | 6/2005 | Araki et al. |
| 6,960,105 B2 | 11/2005 | Uraki et al. |
| 6,971,930 B2 | 12/2005 | Uraki et al. |
| 7,037,147 B2 | 5/2006 | Kinoshita et al. |
| 7,118,431 B2 | 10/2006 | Mizuno et al. |
| 7,140,930 B2 | 11/2006 | Yamada et al. |
| 7,160,158 B2 | 1/2007 | Kinoshita |
| 7,163,425 B2 | 1/2007 | Kamio |
| 7,166,003 B2 | 1/2007 | Motose |
| 7,168,995 B2 | 1/2007 | Masui et al. |
| 7,195,527 B2 | 3/2007 | Tani et al. |
| 7,201,620 B2 | 4/2007 | Kinoshita et al. |
| 7,207,856 B2 | 4/2007 | Ishida et al. |
| 7,364,480 B2 | 4/2008 | Ito et al. |
| 7,364,481 B2 | 4/2008 | Uraki et al. |
| 7,381,106 B2 | 6/2008 | Mizuno et al. |
| 7,422,495 B2 | 9/2008 | Kinoshita et al. |
| 7,513,807 B2 | 4/2009 | Kinoshita et al. |
| RE40,762 E | 6/2009 | Matsuda et al. |
| 7,549,900 B2 | 6/2009 | Kinoshita et al. |
| 7,647,143 B2 | 1/2010 | Ito et al. |
| 7,673,611 B2 | 3/2010 | Matsuda |
| 7,744,433 B2 | 6/2010 | Ozaki et al. |
| 7,802,530 B2 | 9/2010 | Nanami |
| 7,980,904 B2 | 7/2011 | Miguchi |
| 8,162,704 B2 | 4/2012 | Stine |
| 8,186,476 B2 | 5/2012 | Nagao et al. |
| 8,202,136 B2 | 6/2012 | Dagenais et al. |
| 2002/0028613 A1 | 3/2002 | Matsuda et al. |
| 2002/0127926 A1 | 9/2002 | Michel et al. |
| 2003/0000443 A1 | 1/2003 | Bernier et al. |
| 2003/0194926 A1 | 10/2003 | Bernier |
| 2004/0144293 A1 | 7/2004 | Tani |
| 2004/0157507 A1 | 8/2004 | Pease |
| 2005/0263132 A1 | 12/2005 | Yanagihara |
| 2007/0082568 A1 | 4/2007 | Uraki et al. |
| 2009/0111339 A1 | 4/2009 | Suzuki |
| 2011/0223815 A1 | 9/2011 | Kinoshita |

OTHER PUBLICATIONS

National Transportation Safety Board; Safety Study—Personal Watercraft Safety; NTSB/SS-98/01; May 19, 1998; Washington, D.C. 20594.

ENHANCED STEERING

BACKGROUND OF THE INVENTION

The present invention relates to a system, method and apparatus for enhanced steering for use in a watercraft, amphibian or other such vehicle, and in particular, but not exclusively, where the marine propulsion is provided by means of a jet drive.

Jet drive marine propulsion systems are well known in the art and typically comprise a prime mover and jet drive combination. The prime mover provides drive via a drive shaft which rotates an impeller arranged in a duct (conduit) of the jet drive. The duct comprises, at a first proximal end, an inlet generally arranged in the bottom surface of a hull of the watercraft or amphibian for inducting water upstream of the impeller, and, at a second distal end, an outlet generally arranged as an outlet nozzle downstream of the impellor for ejecting water as a jet. The nozzle is generally of a lesser cross-sectional area when compared to that of the duct so as to provide for pressurised and accelerated flow of the water through the duct under the action of the rotating impellor. Propulsion is thus provided by way of a reaction force to the thrust provided by the jet of water ejected via the outlet nozzle. Unlike in watercraft where a submerged rudder is used to effect steering, with a jet drive it is conventional to provide a steering nozzle downstream (to the rear) of the outlet nozzle, and in close registration thereto, which steering nozzle is pivotable about a generally vertical axis so that it may pivot left or right under the control of the steering and direct the jet of water exiting from the outlet nozzle accordingly. Thus, steering of the watercraft or amphibian is effected as a result of the reactionary force to the thrust of the jet exiting the steering nozzle, as steered.

The thrust and steering generated by the jet drive to power and steer the watercraft or amphibian is controlled by the driver or rider by way of a manually operated throttle control device (morse throttle, twist grip biased to idle, pivotable lever biased to idle, or other suitable device) and use of a steering device (wheel, handlebar, tiller, or other suitable device). A known limitation, therefore, with jet drive marine propulsion systems is a reduced (or total lack of) steering function when the manually operated throttle is set to low or idle, or let go and biased towards idle, regardless of a steering request via the steering device, because there is low or no thrust generated by the jet drive. This can present drivers or riders of the watercraft or amphibians with a situation of reduced manoeuvrability and control of the watercraft or amphibian unless the manually operated throttle control is re-applied by the driver or rider. In particular, this can be a problem when travelling at speed and the manually operated throttle is let go of and returns to idle. Typically, it is then no longer possible to steer the watercraft or amphibian effectively as the thrust generated by the jet drive falls away with reduced engine speed. Such a phenomenon is known as off-throttle or off-power steering loss. A number of prior art devices and systems have been developed in particular to deal with the phenomenon of off-throttle or off-power steering loss. Furthermore, at low speed, when attempting docking or beaching manoeuvres, a lack of meaningful steerable thrust has also been perceived by some drivers or riders as a problem, and so a number of prior art devices and systems have been developed to provide assistance with steerable thrust for low speed manoeuvres, such as docking and/or beaching. However, other drivers and riders have found steerable thrust assistance at low (and/or high) speed a positive hindrance as it provides steerable thrust when not intuitively expected and/or when not desired.

In the various prior art devices and systems proposed for addressing the phenomenon of off-throttle or off-power steering loss, a rapid off-throttle event and a threshold steering input is sensed, and often the speed of the watercraft is taken into consideration also. Based on these inputs, the prior art devices and systems either effect a re-application of throttle independently of the driver's or rider's use of the manual throttle control so that the jet drive generates steerable thrust, or a control system activates an elongated deceleration profile independently of the driver's or rider's use/non-use of the manual throttle control so as to slow the usual rate of throttle deceleration and thus slow the loss of steering thrust available via the jet drive.

A problem, therefore, with these known prior art devices and systems is that there is a lag between the device or system sensing a rapid off-throttle event (which is a necessary precursor and sensor input), and then subsequently determining the need for off-throttle or off-power steering. Typically, a threshold steering input is also required to be sensed before the device or system is turned on or implemented. What then follows is either a re-application of throttle, or a deceleration profile is turned on or implemented so as to slow the loss of steering thrust for a predetermined period of time. The resulting effect can provide for unusual and unsettling characteristics of the watercraft or amphibian, or the systems can provide unwanted thrust, particularly in the low speed docking/beaching assist systems. This has resulted in drivers and riders of the watercraft in question switching off entirely or removing the off-throttle or off-power steering and/or low speed docking/beaching assist devices and systems.

SUMMARY OF THE INVENTION

In view of the foregoing, there remains a need for a more simplified device and system which improves upon the performance of prior art devices and systems. The present invention seeks to address this, and does so by offering a fundamentally different proposal, that of a high idle engine speed system, providing watercraft and amphibians with enhanced steering, and that does so with an intuitive response. Unlike known prior art devices and systems which are off and must be turned on or activated when certain conditions are sensed/satisfied (and require a rapid off-throttle event to be sensed), the present invention is on by default when required, but can be turned off when certain conditions are sensed/satisfied. This fundamental difference provides watercraft and amphibians with enhanced steering when required, and does so with an intuitive response.

In a first aspect, the present invention provides a watercraft or amphibian comprising:

a prime mover operable with at least a first and a second idle speed;

a marine propulsion device operable to generate thrust when connected to the prime mover; and a sensor/determining means for sensing/determining whether or not the watercraft or amphibian is operating at or above a determined speed of travel, wherein:

the second idle speed of the prime mover is higher than the first idle speed;

the marine propulsion device generates a steerable thrust when operated by the prime mover at a speed at or above the second idle speed; and the prime mover is operated with the second idle speed when the sensor/determining means senses/determines the watercraft or amphibian is operating at or above the determined speed of travel.

In a second aspect, the present invention provides a method for providing enhanced steering for a watercraft or amphibian, the watercraft or amphibian comprising:

a prime mover operable with at least a first and a second idle speed, the second idle speed being higher than the first idle speed;

a marine propulsion device operable to generate thrust when connected to the prime mover; and a sensor/determining means for sensing/determining whether or not the watercraft or amphibian is operating at or above a determined speed of travel, wherein the method comprises the steps of:

the marine propulsion device generating a steerable thrust when operated by the prime mover at a speed at or above the second idle speed; and the prime mover operating with the second idle speed when the sensor/determining means senses/determines the watercraft or amphibian is operating at or above the determined speed of travel.

In a third aspect, the present invention provides a watercraft or amphibian operable in displacement and planing modes, the watercraft or amphibian comprising:

a prime mover operable with at least a first and a second idle speed;

a marine propulsion device operable to generate thrust when connected to the prime mover; and a planing sensor for sensing whether the watercraft or amphibian is in a planing or a displacement mode, wherein:

the second idle speed of the prime mover is higher than the first idle speed;

the marine propulsion device generates a steerable thrust when operated by the prime mover at a speed at or above the second idle speed; and the prime mover is operated with the second idle speed when the planing sensor senses the watercraft or amphibian is in a planing mode.

In a fourth aspect, the present invention provides a method for providing enhanced high speed steering for a watercraft or amphibian, the watercraft or amphibian comprising:

a prime mover operable with at least a first and a second idle speed, the second idle speed being higher than the first idle speed;

a marine propulsion device operable to generate thrust when connected to the prime mover; and a planing sensor for sensing whether the watercraft or amphibian is in a planing or a displacement mode, wherein the method comprises the steps of:

the marine propulsion device generating a steerable thrust when operated by the prime mover at a speed at or above the second idle speed; and the prime mover operates with the second idle speed when the planing sensor senses the watercraft or amphibian is in a planing mode.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENTS

The system, method and apparatus for enhanced steering according to the present invention provides a high idle (also termed a "second idle") engine speed when the watercraft or amphibian is operated in marine mode at or above a given speed of travel, which given speed of travel may be settable or programmable (and either fixed or dynamic in use), providing a "determined speed of travel". With the high idle engine speed active at or above the determined speed of travel, the engine always provides a steerable thrust via the jet drive since the engine speed cannot fall below a speed (at least for a certain period of time) at which steerable thrust is no longer provided via the jet drive, even in the event of a rider or driver accidentally or intentionally letting go of the manually operated throttle. The enhanced steering is active and available when the watercraft or amphibian is travelling at or above the determined speed of travel in marine mode, e.g. travelling at high speed on water and, in certain embodiments, when steering is required or demanded. The high idle engine speed can, however, be switched off by a driver or rider, or the control system. For example, a manual override button or switch may be used by a driver or rider to switch off the high idle engine speed once activated, and/or the control system may limit the period of time the high idle engine speed is active. Furthermore, the high idle engine speed may be de-activated when the watercraft or amphibian slows below a determined speed of travel in marine mode, e.g. when coming off the plane.

Figure 1:
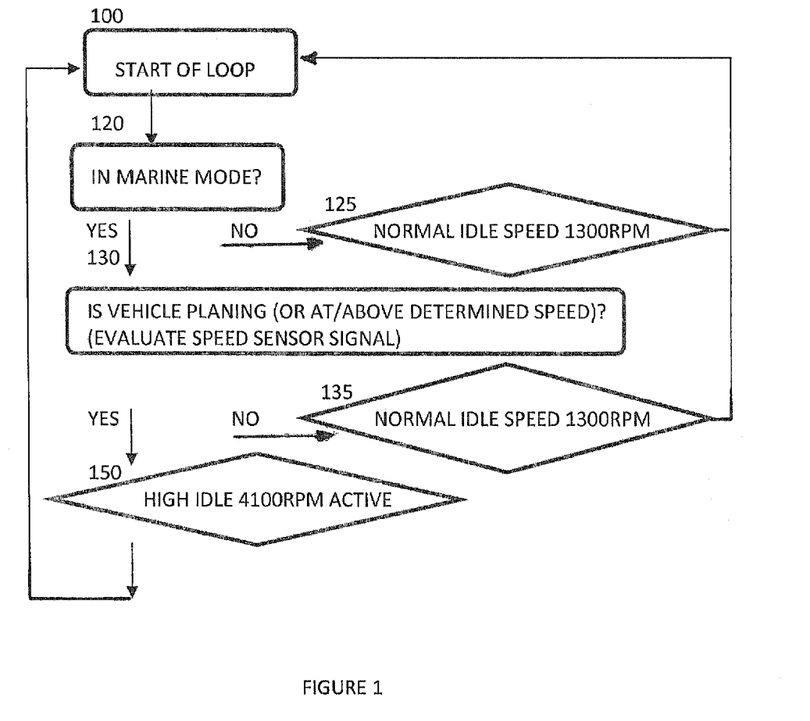
FIG. 1 is a schematic flow diagram of a first preferred embodiment of enhanced steering according to the present invention.

Referring first to FIG. 1, there can be seen a schematic flow diagram illustrating an operating mode of a first preferred embodiment of enhanced steering according to the present invention for use in watercraft, amphibians and other such vehicles. In this first preferred embodiment, the prime mover (not shown) is a conventional spark ignition combustion engine having a "normal" idle (also termed a "first" idle) speed of approximately 1300 revolutions per minute (rpm), a "high" idle (also termed a "second" idle) speed of approximately 4100 rpm, and can operate at approximately 8000 rpm at full throttle. The throttle can be controlled manually by the rider or driver to operate the engine in the range from 1300 rpm to 8000 rpm. The system can, independently of the rider or driver, set a high idle speed such that the throttle cannot fall below the high idle speed, provided certain conditions are met, as will now be described by way of example only. The flow diagram illustrates a first step 100 of the sequence at "Start of Loop". Next, at step 120 "In Marine Mode?", the system determines either by way of sensing using a suitable sensor and/or by way of other suitable determination (e.g. mode selection) if the watercraft or amphibian is in a marine mode. If it is determined that the watercraft or amphibian is not in a marine mode, then the normal idle speed of 1300 rpm is operational, as shown at step 125 "Normal Idle Speed 1300 rpm", and the system returns to step 100 of the sequence at "Start of Loop". Alternatively, if it is determined that the watercraft or amphibian is in a marine mode, then the system moves to the next step 130 "Is Vehicle Planing (or at/above Determined Speed)?". Here, the system determines either by way of sensing using a suitable sensor (e.g. speed of travel sensor) and/or by way of other suitable determination if the watercraft or amphibian is at or above the determined speed of travel. In this first embodiment, the determined speed of travel is when the watercraft or amphibian is planing (although, as described above, the determined speed of travel may be set at any speed of travel lower or higher than a planing speed). Preferably, the sensor used is a water presence sensor and is positioned in the watercraft or amphibian such that it is substantially dry when planing, and substantially wet when in a displacement condition. If it is determined that the watercraft or amphibian is not planing (water presence sensor is wet), then the normal idle speed of 1300 rpm is operational, as shown at step 135 "Normal Idle Speed 1300 rpm", and the system returns to step 100 of the sequence at "Start of Loop". Alternatively, if it is determined that the watercraft or amphibian is planing (water presence sensor is substantially dry), then the high idle speed of 4100 rpm is operational, as shown at step 150 "High Idle Speed 4100 rpm Active", and the system returns to step 100 of the sequence at "Start of Loop". With the high idle speed of 4100 rpm active when planing (or at/above the determined speed of travel) in the marine mode, the engine always provides a steerable thrust in this state via the jet drive since the engine speed cannot fall below a speed at which steerable thrust is no longer provided via the jet drive, even in the event of a rider or driver accidentally or intentionally letting go of the manually operated throttle. In short, the system is always default "on" when in marine mode, and is turned "off" when the speed of travel falls below the determined speed of travel.

The water sensor may take any suitable form, but in this first preferred embodiment is an optical sensor providing an electrical output signal based on refractive measurements. The electrical output signal from the water sensor is then processed to take account of the effects of splash and transients, e.g. when moving from wet to dry conditions and vice-versa. For example, the water sensor may determine a WET output if it is wet for more than a preset number of seconds W, where W is programmable. Alternatively, or in addition, an EWMA co-efficient may be used. Where the determined speed of travel is set lower than a speed where the watercraft or amphibian is planing, the electrical output signal from the water sensor may be processed differently to take account of the determined speed of travel to be measured. Alternatively, or in addition, other suitable sensors may be beneficially employed. For example, a paddle wheel speed sensor may be used to detect the speed of travel by measuring the water flow through vanes of the paddle wheel which acts to rotate the paddle wheel. Alternatively, or additionally, a global positioning system (GPS) or a pressure sensing system (e.g. pitot tube, hull pressure sensor, or jet drive pressure sensor etc.) may be used.

The speed of the engine is effected by controlled opening of an air inlet valve, typically a butterfly valve, as is conventional in the art. Opening of the inlet air valve permits air to be admitted and mixed with fuel for combustion in one or more cylinders of the engine. The degree of opening of the air inlet valve controls the amount of air admitted for combustion, which in turn controls the resulting speed (rpm) of the engine. The air inlet valve or valves are actuated by the manually operated throttle control device and/or a solenoid actuator, both of which are mechanically coupled to the air inlet valve or valves. In the first preferred embodiment, the manually operated throttle control device takes the form of a manually operated lever, biased to a closed position, mounted on handlebars and which is mechanically coupled to the engine throttle via a pull cable. Opening of the throttle, thus increasing the engine speed, is effected by the rider or driver moving the lever against its bias and pulling the cable. In turn, the cable pulls open the throttle, opening the air inlet valve(s), thereby admitting more air for combustion. The speed of the engine is thus dependent upon the degree of actuation of the lever, subject to the position of the solenoid actuator (see below). The biasing action serves to return the lever, cable and throttle to a closed position, again subject to the position of the solenoid actuator, when the driver eases or releases the lever, ultimately back to idle (normal idle or high idle, as appropriate). In addition, a solenoid actuator is provided and is also mechanically coupled to the to the engine throttle (and operates independently of the manually operated throttle control device). The stroke of the solenoid is sufficient to effect opening of the throttle to a desired position. The electronic control unit (ECU) provides a command signal to the solenoid, and when commanded, the solenoid holds open the throttle at the desired position. In this first preferred embodiment, the desired position (at full stroke) equates to the high idle speed of 4100 rpm. Consequently, when commanded, the solenoid actuator provides a high idle speed of 4100 rpm, above which the manually operated throttle control device can function as normal, but below which the solenoid actuator takes precedence (and when the manually operated throttle control device returns towards and to the normal idle speed under the biasing action). Alternatively, when not commanded, the solenoid actuator is retracted (at zero stroke) and does not affect the usual low idle speed of 1300 rpm, above which the manually operated throttle control device can function as normal.

It will be appreciated, however, that in alternative embodiments, the speed of the prime mover may be controlled or throttled by way of any suitable control means. For example, where a combustion engine is used, throttling may be effected by way of control of air and/or fuel admission/injection, combustion timing, or any other suitable control (including ECU controlled) devices. Alternatively, where an electric or hydraulic motor or hybrid is used, the supply of current or hydraulic fluid or other power means may be controlled, or any other suitable control (including ECU controlled) device employed.

Figure 2:
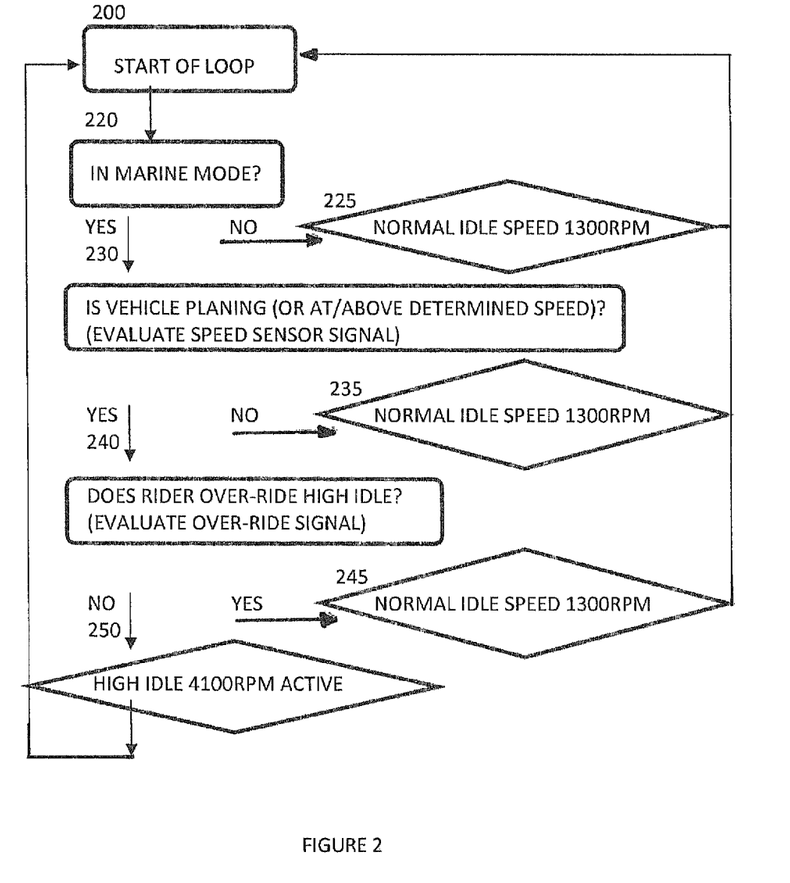
FIG. 2 is a schematic flow diagram of a further preferred embodiment of enhanced steering according to the present invention.

Referring next to FIG. 2, there can be seen a schematic flow diagram illustrating an operating mode of a further preferred embodiment of enhanced steering according to the present invention for use in watercraft, amphibians and other such vehicles. In this further preferred embodiment, the system functions (and the apparatus is) as described above in relation to the first preferred embodiment, save for the introduction of an additional input, a manual over-ride button for the rider or driver to positively select the low idle speed to turn the system off. Accordingly, as before, the flow diagram illustrates a first step 200 of the sequence at "Start of Loop". Next, at step 220 "In Marine Mode?", the system again determines either by way of sensing using a suitable sensor and/or by way of other suitable determination (e.g. mode selection) if the watercraft or amphibian is in a marine mode. If it is determined that the watercraft or amphibian is not in a marine mode, then the normal idle speed of 1300 rpm is operational, as shown at step 225 "Normal Idle Speed 1300 rpm", and the system returns to step 200 of the sequence at "Start of Loop". Alternatively, if it is determined that the watercraft or amphibian is in a marine mode, then the system moves to the next step 230 "Is Vehicle Planing (or at/above Determined Speed)?". Here, the system determines either by way of sensing using a suitable sensor (e.g. speed of travel sensor) and/or by way of other suitable determination if the watercraft or amphibian is planing. While, again, the determined speed of travel is when the watercraft or amphibian is planing, as described above the determined speed of travel may be set at any speed of travel lower (or higher) than a planing speed. Preferably, the sensor used is a water presence sensor and is positioned in the watercraft or amphibian such that it is substantially dry when planing, and substantially wet when in a displacement condition. If it is determined that the watercraft or amphibian is not planing (water presence sensor is wet), then the normal idle speed of 1300 rpm is operational, as shown at step 235 "Normal Idle Speed 1300 rpm", and the system returns to step 200 of the sequence at "Start of Loop". Alternatively, if it is determined that the watercraft or amphibian is planing (water presence sensor is substantially dry), then the system moves to the next step 240 "Did Rider Over-ride High Idle?". Here, the system determines by way of sensing using a suitable sensor if the over-ride button or switch has been operated while the watercraft or amphibian is planing. Preferably, the sensor used is a prominent button or switch and is positioned in the watercraft or amphibian such that it provides ease of access to a rider or driver. If it is determined that a high idle speed is not desired by the rider or driver (button or switch activated when at/above determined speed of travel), then the normal idle speed of 1300 rpm is operational, as shown at step 245 "Normal Idle Speed 1300 rpm", and the system returns to step 200 of the sequence at "Start of Loop". Alternatively, if it is determined that a low idle speed is not desired by the rider or driver (button or switch not activated when at/above determined speed of travel), then the high idle speed of 4100 rpm is operational, as shown at step 250 "High Idle Speed 4100 rpm Active", and the system returns to step 200 of the sequence at "Start of Loop". With the high idle speed of 4100 rpm active when planing (or at/above the determined speed of travel) in the marine mode and not over-ridden, the engine always provides a steerable thrust in this state via the jet drive since the engine speed cannot fall below a speed at which steerable thrust is no longer provided via the jet drive, even in the event of a rider or driver accidentally or intentionally letting go of the manually operated throttle. In short, the system is default "on" when in marine mode, and is turned "off" when the speed of travel falls below the determined speed of travel and/or the rider or driver turns it off using the button or switch.

Figure 3:
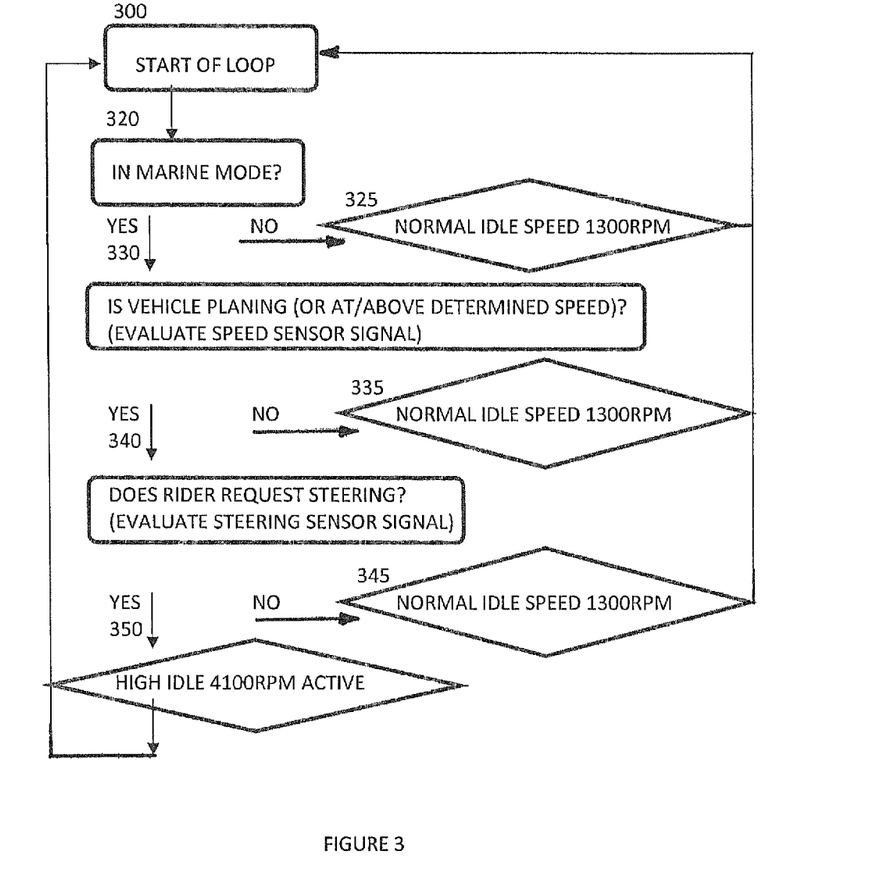
FIG. 3 is a schematic flow diagram of a yet further preferred embodiment of enhanced steering according to the present invention.

Referring next to FIG. 3, there can be seen a schematic flow diagram illustrating an operating mode of a yet further preferred embodiment of enhanced steering according to the present invention for use in watercraft, amphibians and other such vehicles. In this preferred embodiment, the system functions (and the apparatus is) as described above in relation to the further preferred embodiment of FIG. 2, save for the substitution of the manual over-ride button or switch with an alternative method of switching the system off, namely a steering request/no request determination, for the rider or driver to positively select the low idle speed by turning the system off. Accordingly, as before, the flow diagram illustrates a first step 300 of the sequence at "Start of Loop". Next, at step 320 "In Marine Mode?", the system again determines either by way of sensing using a suitable sensor and/or by way of other suitable determination (e.g. mode selection) if the watercraft or amphibian is in a marine mode. If it is determined that the watercraft or amphibian is not in a marine mode, then the normal idle speed of 1300 rpm is operational, as shown at step 325 "Normal Idle Speed 1300 rpm", and the system returns to step 300 of the sequence at "Start of Loop". Alternatively, if it is determined that the watercraft or amphibian is in a marine mode, then the system moves to the next step 330 "Is Vehicle Planing (or at/above Determined Speed)?". Here, the system determines either by way of sensing using a suitable sensor (e.g. speed of travel sensor) and/or by way of other suitable determination if the watercraft or amphibian is planing. While, again, the determined speed of travel is when the watercraft or amphibian is planing, as described above the determined speed of travel may be set at any speed of travel lower (or higher) than a planing speed. Preferably, the sensor used is a water presence sensor and is positioned in the watercraft or amphibian such that it is substantially dry when planing, and substantially wet when in a displacement condition. If it is determined that the watercraft or amphibian is not planing (water presence sensor is wet), then the normal idle speed of 1300 rpm is operational, as shown at step 335 "Normal Idle Speed 1300 rpm", and the system returns to step 300 of the sequence at "Start of Loop". Alternatively, if it is determined that the watercraft or amphibian is planing (water presence sensor is substantially dry), then the system moves to the next step 340 "Does Rider Request Steering". Here, the system determines by way of sensing using a suitable sensor if the steering nozzle or handlebars have been moved to a substantially "straight ahead" position from a "steering desired" position when the watercraft or amphibian is planing. Preferably, the sensor used is a rheostat and is positioned in the watercraft or amphibian such that it provides a variable electrical output dependent upon the degree of steering (from zero to full lock in both the left and right hand directions). If it is determined that the watercraft or amphibian is not desired to be steered (rheostat output signal), then the normal idle speed of 1300 rpm is operational, as shown at step 345 "Normal Idle Speed 1300 rpm", and the system returns to step 300 of the sequence at "Start of Loop". As such, the rider or driver can turn the system off when no steering is desired by moving the steering nozzle or handlebars to a substantially "straight ahead" position. Alternatively, if it is determined that the watercraft or amphibian is desired to be steered (rheostat output signal), then the high idle speed of 4100 rpm is operational, as shown at step 350 "High Idle Speed 4100 rpm Active", and the system returns to step 300 of the sequence at "Start of Loop". With the high idle speed of 4100 rpm active when planing (or at/above the determined speed of travel) in the marine mode and when steering is desired, the engine always provides a steerable thrust in this state via the jet drive since the engine speed cannot fall below a speed at which steerable thrust is no longer provided via the jet drive, even in the event of a rider or driver accidentally or intentionally letting go of the manually operated throttle. In short, the system is default "on" when in marine mode, and is turned "off" when the speed of travel falls below the determined speed of travel and/or the rider or driver sets the steering straight ahead.

In the preferred embodiments described, the high idle engine speed is provided under the control of the ECU based on determining the necessary sensor inputs. It will be appreciated, however, that the various sensors described may take any suitable form (by way of supplementation and/or substitution), provided they serve to sense and provide the necessary inputs required for the ECU to make a determination. For example, the water sensor may take the form of a global positioning system (GPS) for use in determining if the watercraft or amphibian is operating at/above the determined speed of travel. Alternatively, the GPS may be provided in addition as a backup. Further, a pressure sensor or sensor array in the jet drive may be used in place of, or in addition to, these to determine if the watercraft or amphibian is operating at/above the determined speed of travel. In such a case, the pressure sensor or sensors may be calibrated to detect pressure thresholds above which a determination can be made on whether the watercraft or amphibian is operating at/above the determined speed of travel (e.g. planing) or not. Alternatively, or additionally, other pressure sensing systems (e.g. pitot tube, hull pressure sensor(s), etc.) may be used to determine whether or not the watercraft or amphibian is operating at/above the determined speed of travel. Alternatively, or additionally, the volumetric flow rate of water through the jet drive may be sensed or measured and used to determine whether or not the watercraft or amphibian is operating at/above the determined speed of travel. Alternatively, or additionally, a paddle wheel speed sensor may be used to detect the speed of travel by measuring the water flow through vanes of the paddle wheel which acts to rotate the paddle wheel, and thus whether or not the watercraft or amphibian is operating at/above the determined speed of travel. Alternatively, or additionally, the pitch of the watercraft and/or amphibian (about a transverse axis) relative to the water in/on which it is travelling may be used to detect the speed of travel (e.g. relative to datum—(more) level when planing and (more) angled with bow up/stern down attitude bias when displaced and/or static), and thus whether or not the watercraft or amphibian is operating at/above the determined speed of travel. Indeed, it will appreciated that calibration of any of the sensors employed, and the use of signal processing techniques, may be beneficially employed to optimise the system implemented in a particular watercraft or amphibian. For example, in the preferred embodiment of FIG. 3 which additionally senses if a certain steering is desired or demanded, this may require sensing that the steering angle of the steering nozzle or handlebar is turned beyond an absolute steering threshold (which is adjustable/programmmable) of typically greater than, say, 5, 10, 15 or 20 degrees in either direction from the straight ahead position (0 degrees), where the total steering angle range is, say, −25 to +25 degrees. However, alternative methods of processing the desire or demand for steering exist, such as measuring the acceleration of the steering nozzle or handlebars when turned, and using algorithms or variations thereof. In scenarios where electrical interference may be a threat to the reliability of the sensors used, or the sensed signals, mechanical means may be employed in addition to, or in place of, electrical means. Similarly, mechanical switches or proximity sensors may be positioned in close proximity on either side of the steering nozzle so as to be activated or sensed by a turned or turning steering nozzle to detect a desired steering input or demand. As an alternative to sensing steering desire or demand, various other possibilities exist. For example, the roll of the watercraft or amphibian (about a longitudinal axis) can be sensed since a rider or driver will tend to lean when wishing to turn, and onboard fluids will move, thus shifting the centre of gravity. As such, it is possible to sense the angle of roll (e.g. by way of an inclinometer etc.), a change in the centre of gravity from datum (e.g. by way of gyroscope, float sensors etc.), measured pressure differentials in fluid reservoirs (e.g. fuel tank, cooling fluid reservoirs, etc.) or measured pressure differentials laterally across the hull surface (e.g. laterally spaced pressure sensors across the beam of the hull surface) and by way of pressure pads under the or each foot of a rider or driver (e.g. to sense increases/decreases in pressure and differential pressures between left and right feet). Alternatively, suitable voice commands, such as "TURN", from a rider or driver can be sensed and acted upon. Any one or more of these alternative methods of sensing and processing the desire or demand for steering can be used in place of sensing and processing a classic steering input from a handlebar or steering wheel.

A further refinement, which provides for additional calibration of the system, is to employ programmable timers (or delays) for the various functions or for sensing of the sensed parameters. This/these may be beneficially employed in any of the embodiments described. For example, in certain scenarios it may prove useful for the high idle speed to be active only for a determined amount of time, e.g. 1 to 3 seconds, sufficient to provide steerable thrust before the watercraft or amphibian comes down off the plane and slows to a halt. Alternatively, if a rider or driver lets go of the manually operable throttle control and effects a steering action, in certain scenarios it may then prove useful for the high idle speed to be active for a determined amount of time, e.g. 1 to 3 seconds, sufficient to make the desired manoeuvre before the watercraft or amphibian comes down off the plane and slows to a halt. Similarly, the transition from planing to displacement mode, and vice versa, can take some seconds (depending upon whether the watercraft or amphibian is being turned—more resistance, quicker to slow—or travelling straight ahead), and so this can also be relevant in terms of the time it takes for a dry water sensor (planing) to detect water (displacement), and this can be taken advantage of in terms of how the system is calibrated. For example, the various idle speeds may be set, settable, programmed, programmable and/or selected in use by the ECU based on the particular marine characteristics of the watercraft or amphibian in question (e.g. shape, length, beam, weight, etc.) and/or the sensed parameters in operation (speed, loading, etc.). In particular, it will be appreciated that certain watercraft or amphibians will come off the plane quicker/slower than others, and so will cause the water sensor to become WET sooner/later, thus affecting the period of time the high idle speed is active. Accordingly, the various idle speeds and/or the active period of high idle speed selected will be or can be varied depending on the particular configuration, and may be varied/optimised in use to suit particular requirements.

It will be appreciated that while the prime mover has been described as a spark ignition internal combustion engine, drive (power) to the jet drive may be provided by any one or more suitable power sources in any combination such as, for example without limitation, a compression ignition engine, an electric motor, a hydraulic motor, a hybrid engine or a jet engine. It will also be appreciated that the figures of 1300 rpm, 4100 rpm and 8000 rpm described above for low idle engine speed, high idle engine speed and maximum engine speed are typical only and not fixed. Indeed, each, some or all may be varied to suit and optimise the particular configuration of prime mover and jet drive used. As such, all engine speeds stated above are indicative only.

Furthermore, in the foregoing description, reference has been made to a watercraft and an amphibian, and this is intended to include also within its scope, without limitation, vehicles with all-terrain and amphibious capability, personal watercraft, boats and the like.

The known limitation of reduced (or total lack of) steering function in marine propulsion systems when a manually operated throttle is set to low or idle, or let go and biased towards idle, regardless of a steering request via the steering device, is not limited to jet drives. It is also experienced to one degree or another with propeller, z-drive, outboard motor and other marine propulsion systems. In these marine propulsion systems, however, an appendage, typically a rudder or fin, is usually provided in the water at all speeds to provide some degree of steerage. Nevertheless, the present invention can also be beneficially employed in watercraft or amphibians provided with these marine propulsion systems.

Although different embodiments of enhanced steering according to the present invention have been described above, any one or more or all of the features described (and/or claimed in the appended claims) may be provided in isolation or in various combinations in any of the embodiments or in further embodiments. As such, any one or more these features may be removed, substituted and/or added to any of the feature combinations described and/or claimed. For the avoidance of doubt, any of the features of any embodiment may be combined with any other feature from any of the embodiments, even to the extent of creating a new embodiment.

Accordingly, whilst preferred embodiments of the present invention have been described above and illustrated in the drawings, these are by way of example only and non-limiting. It will be appreciated by those skilled in the art that many alternatives are possible within the ambit, spirit and scope of the invention, as set out in the appended claims.

The invention claimed is:

1. A watercraft or amphibian comprising:
a prime mover operable with at least a first and a second idle speed;
a marine propulsion device operable to generate thrust when connected to the prime mover; and
a determining arrangement for determining whether or not the watercraft or amphibian is operating at or above a determined speed of travel, wherein:
the second idle speed of the prime mover is higher than the first idle speed;
the marine propulsion device generates a steerable thrust when operated by the prime mover at a speed at or above the second idle speed; and
the prime mover is operated with the second idle speed when the determining arrangement determines the watercraft or amphibian is operating at or above the determined speed of travel.

2. The watercraft or amphibian as claimed in claim 1, further comprising:
a manually operated thrust control device operable by an operator of the watercraft or amphibian to manually control in amount the speed of the prime mover and thus thrust generated by the marine propulsion device, and wherein: the prime mover is operated with the second idle speed when the determining arrangement determines the watercraft or amphibian is operating at or above the determined speed of travel such that the marine propulsion device provides a steerable thrust independently of the manually operated thrust control device.

3. The watercraft or amphibian as claimed in claim 1, wherein the prime mover comprises an internal combustion engine.

4. The watercraft or amphibian as claimed in claim 1, wherein the marine propulsion device comprises at least one jet drive.

5. The watercraft or amphibian as claimed in claim 1, wherein the determining arrangement comprises any one or more of a water sensor, a global positioning system, a paddle wheel sensor, a pitch sensor, a volumetric flow sensor and a pressure sensor.

6. The watercraft or amphibian as claimed in claim 1, wherein the determined speed of travel is either fixed or variable, and when variable is set or programmed in use.

7. The watercraft or amphibian as claimed in claim 1, wherein the determined speed of travel is a planing speed of the watercraft or amphibian.

8. The watercraft or amphibian as claimed in claim 1, further comprising:
a manual over-ride operable by the operator, wherein the prime mover is operated with the second idle speed when the determining arrangement determines the watercraft or amphibian is operating at or above the determined speed of travel and the manual over-ride has not subsequently been operated by the operator.

9. The watercraft or amphibian as claimed in claim 8, wherein the manual over-ride operable by the operator is at least one of a switch and a button.

10. The watercraft or amphibian as claimed in claim 8, wherein the manual over-ride operable by the operator comprises a steering device.

11. The watercraft or amphibian as claimed in claim 1, further comprising:
a steering sensor for sensing whether or not steering is desired, wherein the prime mover is operated with the second idle speed when the determining arrangement determines the watercraft or amphibian is operating at or above the determined speed of travel and the steering sensor senses that steering is desired.

12. The watercraft or amphibian as claimed in claim 1, further comprising:
a mode determining arrangement for determining if the watercraft or amphibian is operating in a marine mode, and wherein the prime mover is operated with the second idle speed when it is determined that the watercraft or amphibian is in a marine mode and the determining arrangement determines the watercraft or amphibian is operating at or above the determined speed of travel.

13. The watercraft or amphibian as claimed in claim 12, wherein the prime mover is operated with the second idle speed for at least a minimum period of time when it is determined that the watercraft or amphibian is in a marine mode and the determining arrangement determines the watercraft or amphibian is operating at or above the determined speed of travel.

14. The watercraft or amphibian as claimed in claim 1, wherein the prime mover is operated with the second idle speed for at least a minimum period of time when the determining arrangement determines the watercraft or amphibian is operating at or above the determined speed of travel.

15. The watercraft or amphibian as claimed in claim 13, wherein the minimum period of time for operating the prime mover with the second idle speed is a variable in duration.

16. The watercraft or amphibian as claimed in claim 1, wherein the prime mover is operated with the first idle speed when not operated with the second idle speed.

17. The watercraft or amphibian as claimed in claim 1, wherein the operation of the prime mover with the second idle speed is time limited, following which the prime mover is operated with the first idle speed.

18. The watercraft or amphibian as claimed in claim 11, wherein the steering sensor determines if steering is desired via movement of a steering nozzle.

19. The watercraft or amphibian as claimed in claim 11, wherein the steering sensor determines if steering is desired by any one or more of:

sensing roll of the watercraft or amphibian;
sensing a change in the centre of gravity of the watercraft or amphibian;
measuring pressure differentials by way of at least one pressure sensor in fluid reservoirs in the watercraft or amphibian;
measuring pressure differentials by way of at least one pressure sensor provided laterally across the hull surface of the watercraft or amphibian;
measuring pressure differentials by way of pressure sensors under at least one foot of an operator of the watercraft or amphibian; and
sensing voice commands of an operator of the watercraft or amphibian.

20. The watercraft or amphibian as claimed in claim 1, wherein the first idle speed of the prime mover is in the range of 0 to 3999 rpm and the second idle speed of the prime mover is in the range of 4000 to 8000 rpm.

21. The watercraft or amphibian as claimed in claim 1, wherein the first idle speed of the prime mover is in the range of 0 to 1499 rpm and the second idle speed of the prime mover is in the range of 1500 to 8000 rpm.

22. The watercraft or amphibian as claimed in claim 1, wherein the first idle speed of the prime mover is in the range of 0 to 1300 rpm and the second idle speed of the prime mover is in the range of 1400 to 8000 rpm.

23. The watercraft or amphibian as claimed in claim 1, wherein the first idle speed of the prime mover is substantially 1300 rpm and the second idle speed of the prime mover is substantially 4100 rpm.

24. The watercraft or amphibian as claimed in claim 1, further comprising:
an idle actuator operable to control whether the prime mover operates with the first or the second idle speed.

25. The watercraft or amphibian as claimed in claim 1, further comprising:
an electronic control unit, and wherein the electronic control unit controls/determines whether the prime mover is operated with the second idle speed or the first idle speed.

26. The watercraft or amphibian as claimed in claim 1, wherein the prime mover is operated with the second idle speed when the determining arrangement determines the watercraft or amphibian is operating at or above the determined speed of travel, and no steering desire or demand is required and/or sensed.

27. The watercraft or amphibian as claimed in claim 1, wherein the prime mover is operated with the second idle speed when the determining arrangement determines the watercraft or amphibian is operating at or above the determined speed of travel, and without requiring a steering input.

28. The watercraft or amphibian as claimed in claim 1, wherein the prime mover is operated with the second idle speed when the determining arrangement determines the watercraft or amphibian is operating at or above the determined speed of travel, irrespective of whether or not an off-throttle or off-power event occurs.

29. The watercraft or amphibian as claimed in claim 1, wherein the prime mover is operated with the second idle speed when the determining arrangement determines the watercraft or amphibian is operating at or above the determined speed of travel, irrespective of the setting of a manually operated thrust control device operable by an operator of the watercraft or amphibian to manually control in amount the speed of the prime mover.

30. A method for providing enhanced steering for a watercraft or amphibian, the watercraft or amphibian, comprising:
a prime mover operable with at least a first and a second idle speed, the second idle speed being higher than the first idle speed;
a marine propulsion device operable to generate thrust when connected to the prime mover; and
a determining arrangement for determining whether or not the watercraft or amphibian is operating at or above a determined speed of travel, wherein the method comprises the steps of:
the marine propulsion device generating a steerable thrust when operated by the prime mover at a speed at or above the second idle speed; and
the prime mover operating with the second idle speed when the determining arrangement determines the watercraft or amphibian is operating at or above the determined speed of travel.

31. The method for providing enhanced steering for a watercraft or amphibian as claimed in claim 30, the watercraft or amphibian further comprising:
a manually operated thrust control device operable by a rider or driver of the watercraft or amphibian to manually control in amount the speed of the prime mover and thus thrust generated by the marine propulsion device; and wherein the method further comprises:
the prime mover operating with the second idle speed when the determining arrangement determines the watercraft or amphibian is operating at or above the determined speed of travel such that the marine propulsion device provides a steerable thrust independently of the manually operated thrust control device.

32. A watercraft or amphibian operable in displacement and planing modes, the watercraft or amphibian, comprising:
a prime mover operable with at least a first and a second idle speed;
a marine propulsion device operable to generate thrust when connected to the prime mover; and
a planing sensor for sensing whether the watercraft or amphibian is in a planing or a displacement mode, wherein:
the second idle speed of the prime mover is higher than the first idle speed;
the marine propulsion device generates a steerable thrust when operated by the prime mover at a speed at or above the second idle speed; and
the prime mover is operated with the second idle speed when the planing sensor senses the watercraft or amphibian is in a planing mode.

33. The watercraft or amphibian as claimed in claim 32, further comprising:
a manually operated thrust control device operable by an operator of the watercraft or amphibian to manually control in amount the speed of the prime mover and thus thrust generated by the marine propulsion device, and wherein:
the prime mover is operated with the second idle speed when the planing sensor senses the watercraft or amphibian is in a planing mode in order that the marine propulsion device provides a steerable thrust independently of the manually operated thrust control device.

34. The watercraft or amphibian as claimed in claim 32, further comprising the features of claim 1.

35. A method for providing enhanced high speed steering for a watercraft or amphibian, the watercraft or amphibian comprising:

a prime mover operable with at least a first and a second idle speed, the second idle speed being higher than the first idle speed;

a marine propulsion device operable to generate thrust when connected to the prime mover; and a planing sensor for sensing whether the watercraft or amphibian is in a planing or a displacement mode, wherein the method comprises the steps of:

the marine propulsion device generating a steerable thrust when operated by the prime mover at a speed at or above the second idle speed; and the prime mover operates with the second idle speed when the planing sensor senses the watercraft or amphibian is in a planing mode.

36. The method for providing enhanced steering for a watercraft or amphibian as claimed in claim 35, the watercraft or amphibian further comprising:

a manually operated thrust control device operable by an operator of the watercraft or amphibian to manually control in amount the speed of the prime mover and thus thrust generated by the marine propulsion device; and wherein the method further comprises:

the prime mover operates with the second idle speed when the planing sensor senses the watercraft or amphibian is in a planing mode in order that the marine propulsion device provides a steerable thrust independently of the manually operated thrust control device.

37. The method for providing enhanced steering for a watercraft or amphibian as claimed in claim 30, further comprising the features of claim 1.

* * * * *

UNITED STATES PATENT AND TRADEMARK OFFICE
CERTIFICATE OF CORRECTION

PATENT NO. : 9,694,893 B2  
APPLICATION NO. : 14/435637  
DATED : July 4, 2017  
INVENTOR(S) : Jenkins Page 1 of 1

It is certified that error appears in the above-identified patent and that said Letters Patent is hereby corrected as shown below:

Column 1, Lines 19, 23:
"impellor" should be — impeller —

Column 6, Line 13:
Delete "to the" (2nd occurrence)

Column 9, Line 37:
"programmmable" should be — programmable —

Column 11, Line 12:
After "more" insert -- of --

Column 11, Claim 2, Line 50:
After "wherein:" delete ":"

Column 12, Claim 15, Line 54:
Delete "a"

Column 13, Claim 19, Line 2:
"centre" should be — center —

Column 14, Claim 30, Line 2:
Delete "the watercraft or amphibian,"

Column 14, Claim 32, Line 37:
After "amphibian" delete ","

Signed and Sealed this
Twenty-seventh Day of March, 2018

Andrei Iancu
*Director of the United States Patent and Trademark Office*